United States Patent [19]

Wilson et al.

[11] Patent Number: 4,513,379
[45] Date of Patent: Apr. 23, 1985

[54] CUSTOMIZATION WINDOW FOR A COMPUTER NUMERICAL CONTROL SYSTEM

[75] Inventors: William P. Wilson; Catherine M. Hewlett; Werner P. Rieben, all of Charlottesville, Va.

[73] Assignee: General Electric Company, Charlottesville, Va.

[21] Appl. No.: 415,041

[22] Filed: Sep. 7, 1982

[51] Int. Cl.³ .............................................. G06F 15/46
[52] U.S. Cl. ................................... 364/474; 364/136; 364/167; 364/900
[58] Field of Search .............................. 364/131–136, 364/167, 474, 475, 200, 900

[56] References Cited

U.S. PATENT DOCUMENTS

| | | | |
|---|---|---|---|
| 4,034,354 | 7/1977 | Simmons | 364/167 X |
| 4,118,771 | 10/1978 | Pomella et al. | 364/167 X |
| 4,149,235 | 4/1979 | Froyd et al. | 364/136 X |
| 4,200,936 | 4/1980 | Borzcik et al. | 364/136 X |
| 4,215,397 | 7/1980 | Hom | 364/136 |
| 4,228,495 | 10/1980 | Bernhard et al. | 364/136 |

Primary Examiner—Joseph F. Ruggiero
Attorney, Agent, or Firm—Ormand R. Austin

[57] ABSTRACT

A bidirectional communications link, termed a customization window, comprises a series of routines including functions, procedures and status flags implemented in software, interfaced between a machine control logic (MCL) operating to control the auxiliary functions of a computerized numerical control (CNC) system and a numerical control (NC) operating to control the multi-axis motions of the system whereby the MCL, implemented in software, can access the NC, also implemented in software, and control the system but only under conditions dictated by the NC and enforced by the routines of the customization window so that, for example, the integrity of the NC software will not be compromised by any of the MCL software which is of a user programmable type. Additionally, machine setup data and the availability of optional system control features are routed from the NC to the MCL through the customization window. Also the customization window conveys the status of the various operational conditions of the NC to the MCL.

23 Claims, 3 Drawing Figures

CUSTOMIZATION WINDOW FOR A COMPUTER NUMERICAL CONTROL SYSTEM

REFERENCED MATERIAL

Reference is made to four appendices disclosed in microfiche form which set forth a computer program listing including that which is applicable to the present invention. Included are 2 microfiche containing a total of 118 frames.

BACKGROUND OF THE INVENTION

This invention relates generally to numerical control systems for machine tools and more particularly to a computerized numerical control system there for.

Numerical control systems for controlling machine tools in accordance with the execution of stored programs in a digital computer are well known. Such systems control the motion of a machine tool in response to one or more part programs which are stored in a memory after having been loaded into the memory via a punched tape, for example. Upon demand the part program(s) stored thereafter directs the machine through a series of fabrication steps. Where, for example, the machine includes a cutting tool, the relative motion between the workpiece and the cutting tool is normally along three mutually perpendicular axes to make a series of straight line or circular cuts in accordance with a sequence of digital numbers which indicate where the cuts are to be made and their order.

In addition to controlling the axis motions between the cutting tool and the workpiece, numerical control systems are also adapted to control auxilary functions of the machine tool such as tool selection and changing, spindle speed, coolant flow and pallet selection. The number and type of auxiliary functions vary considerably depending upon the type of machine tool being controlled and typically have been performed in the past by separate hardware logic circuits which operate in response to both the sensed conditions on the machine tool and to commands indicated by the selected codes in the part program. More recently, however, programmable controllers have been interfaced with the numerical control system computer apparatus to control the auxiliary functions. Such programmable controllers can be either a separate program processor or an integral part of the numerical control system computer. The advent of a programmable control to a numerical control system provides a number of advantages, the first and foremost of which is that programmable controllers need not be changed when integrating the numerical control system to other types of machine tools. It is only necessary to reprogram the controller to enable it to interface with the particular machine at hand. Additionally, a programmable controller is relatively easier for the user to program because of the type of instruction set which is normally employed and the editing features which are normally available.

SUMMARY OF THE INVENTION

It is therefore an object of the present invention to provide an improvement in numerical control systems for governing the operation of a machine tool or the like.

It is a further object of the present invention to provide an improvement in computer numerical control systems.

It is still a further object of the invention to provide an improvement in a computerized numerical control system which is adapted to control multi-axis motions between the machine tool and the workpiece as well as auxiliary functions associated with the automated fabrication of a machined part.

Still a further object of the invention is to provide an interface between a numerical control system for providing multi-axis motion in a computer numerical control system connected to a machine tool and a machine control logic system for controlling auxiliary functions associated therewith.

It is still another object of the invention to provide a computerized numerical control system wherein the multi-axis motion functions and auxiliary functions are implemented in separate sets of stored programs.

Briefly, the foregoing and other objects are achieved in accordance with a computer numerical control system (CNC) for controlling the operation of a machine tool in the performance of specified operations with respect to a workpiece and comprises interface means between programmable control system means and numerical control system means which coordinate to respectively control the auxiliary functions and plural axis motions of the machine tool. In its preferred form and what is at present considered to be its best mode, the interface means comprises a series of functions, procedures, and flags implemented in software, which comprise a bidirectional communications link between the machine control logic (MCL), implemented in software and embodying the programmable control system means, and the numerical control system means (NC), also implemented in software.

By means of the software interface, termed the customization window, the machine control logic (MCL) can access and control the numerical control (NC) but only through the customization window and under conditions dictated by the NC and enforced by the customization window so that the integrity of the NC software will not be compromised by any of the user programmable functions and procedures programmed into the MCL. Additionally, machine setup data and availability of optional system control features are provided to the MCL through the customization window. Also, the customization window conveys back the status of various conditions and program execution steps of the NC software routines in the form of flags to the MCL to effect efficient concurrent operation between the MCL and the NC.

BRIEF DESCRIPTION OF THE DRAWINGS

While the present invention is defined in the claims annexed to and forming a part of this specification, a better understanding can be had by reference to the following description when taken in conjunction with the accompanying drawings in which:

DESCRIPTION OF THE PREFERRED EMBODIMENT

Figure 1:
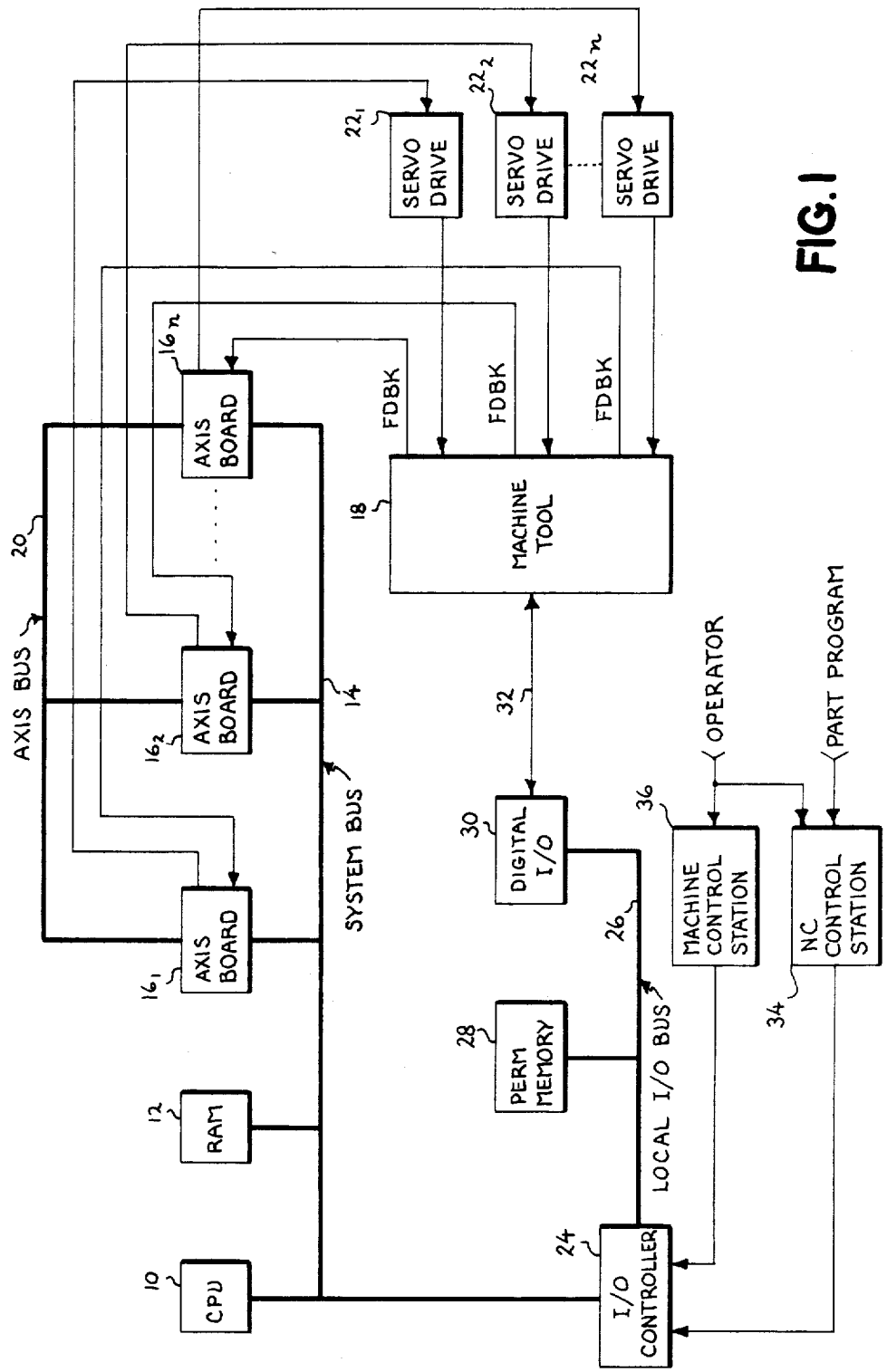
FIG. 1 is a block diagram illustrative of the hardware architecture of a computerized numerical control system (CNC) within which the subject invention is embodied.

Referring now to the drawings and more particularly to FIG. 1, there is disclosed for purposes of illustration the operational environment within which the present invention resides. FIG. 1 discloses a simplified block diagram of a computer numerical control (CNC) system including, inter alia, a central processing unit (CPU) 10 implemented, for example, by an Intel 8086 microprocessor, which is adapted to perform processing operations for the system in response to a plurality of instructions or programs forming a series of routines expressed in block type statements. Along with the CPU 10, the system includes a random access memory (RAM) 12 which acts as a temporary or working storage for the system and is coupled to the system CPU 10 and other functional portions of the system through a system bus 14. A plurality of axis boards $16_1, 16_2 \ldots 16_n$ are shown coupled to the system bus 14 and are adapted to provide respective control functions for each axis of a plurality of driven axes of machine tool 18 and which is adapted to provide the motion of a cutting tool, not shown, relative to a workpiece for fabricating a machined part in a fashion well known to those skilled in the art. When desirable, the axis boards $16_1, 16_2 \ldots 16_n$ may be integrated into a single board. Each axis board $16_1 \ldots 16_n$ contains a microcomputer, not shown, which serves as a front end processor or supervisory processor to coordinate the interrelated functions for the plurality of machine tool axes and accordingly each axis is associated with a separate microcomputer which controls that axis. Because the front end microcomputer can be located apart from the actual location of the particular axis control microcomputer with which it is associated, a common axis communication bus 20 is provided between the axis boards $16_1, 16_2 \ldots 16_n$. Each axis board $16_1, 16_2 \ldots 16_n$, moreover, is adapted to feed control signals to a respective servo drive unit $22_1, 22_2 \ldots 22_n$ which effect the required axis motions as the result of closed loop servo operation which operates to drive an axis motor, not shown, in a particular direction until a zero error signal is reached in response to the comparison of a drive signal and a feedback signal sent back to the axis boards from the machine tool 18. This type of operation is conventional and well known to those skilled in the art of positional control systems.

An input-output (I/O) controller 24 coordinates operations and serves to connect the system bus 14 to a local input-output I/O bus 26 which connects to a permanent or non-volatile memory 28 in which part programs as well as all other system data which must be preserved are stored. The local I/O bus 26 also is coupled to a local digital input/output unit 30 which is adapted to operate to generate digitized actuator control signals for implementing such auxiliary functions as tool selection and changing, spindle speed, coolant flow control as well as pallet selection and/or changing. It also monitors the status of contact inputs from the machine tool 18. This connection is made by means of a bidirectional digital I/O link 32.

A numerical control station 34 and a machine control station 36 are also connected to the I/O controller 24. The numerical control station 34 serves as a front panel to machine tool operators, part programmers and designers and includes an external device, not shown, such as a paper tape or cassette reader through which the part programs may be inputted through the I/O controller 24 to the non-volatile memory 28. The machine control station 36, on the other hand, is a control panel from which the machine tool operator can perform manual operations through manual commands and control the execution of the part programs.

The computer numerical control or simply CNC system illustrated in FIG. 1 operates under the control of the CPU 10 which executes programs residing in the RAM 12. Part programs stored in a non-volatile memory 28, for example, are transferred to the RAM 12 through the I/O controller 24 for execution. The CPU 10 directs execution of the part program through the system bus 14. The CPU 10 generates the appropriate drive signals for the servo drive units $22_1, 22_2 \ldots 22_n$. Non axis commands are executed through the local digital I/O unit 30 via the system bus 14, the I/O controller 24 and the local I/O bus 26. Commands entered with push buttons, for example, on the machine control station 36, are communicated to the I/O controller 24 and finally to the machine tool 18 through either the axis boards $16_1 \ldots 16_n$ or the local digital I/O unit 30.

As is well known, a CNC as with most other computer control systems, has evolved from a hardwired system into essentially a computer architecture which is tailored into a control system through the use of software which comprises one or more sets of computer programs or routines. Accordingly, computer programs currently provide a means for reconfiguring each computer system into a system equivalent to earlier hardwired systems and, moreover, direct the computer to operate in a particular fashion in order to implement the desired result.

Figure 2:
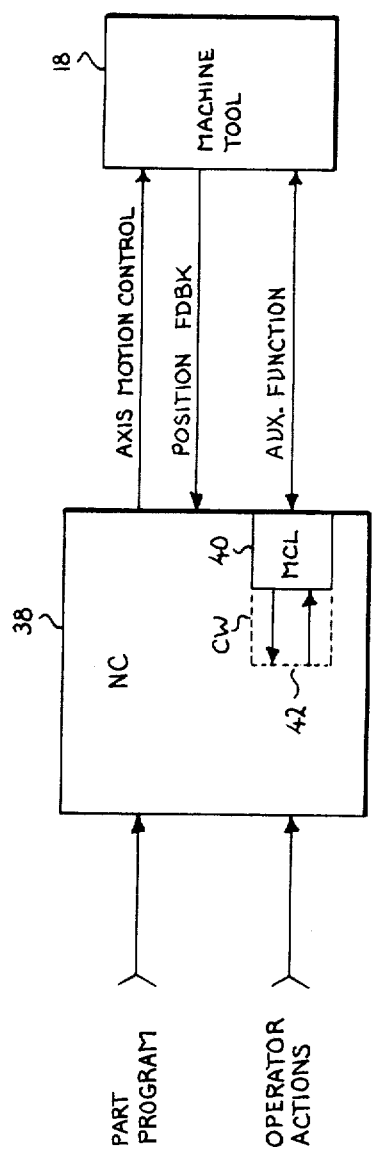
FIG. 2 is a simplified diagram illustrative of the relationship of the customization window (CW) comprising the subject invention, interfaced between the machine control logic (MCL) and the numerical control (NC) of a CNC system according to FIG. 1 and which is adapted to operate in concert to control a machine tool.

Bearing the foregoing in mind, the subject invention comprises a bidirectional protective communications link embodied in software whose source code, expressed in a programming language such as PASCAL, comprises a plurality of functions, procedures and flags, to be enumerated subsequently, that interface between the numerical control portion of the CNC system shown in FIG. 1, hereinafter referred to simply as the NC, and which is implemented in software and controls the axis motions of a cutting tool relative to a workpiece located on the machine tool 18 and the machine control logic portion of the CNC system, hereinafter referred to simply as the MCL, and which is also implemented in software and controls the auxiliary functions of the machine tool 18. Through this software interface, termed a customization window (CW), the original equipment manufacturer or user, for example, who normally provides both the MCL software and machine tool is able to customize and tailor the control provided by the NC software to his specific needs without violating the integrity of the NC software which is provided by another source, for example, the control manufacturer. This particular feature results in the fact that the customization window contains the linkage map, i.e. the addresses of the specific routines through which the MCL can have access to the NC. This is basically illustrated in FIG. 2 wherein reference numeral 38 represents the NC and reference numeral 40 designates the MCL. Part programs and manual commands which are applied to the NC 38 control the axis motion of the machine tool 18 which in turn feeds back positional information to the NC. The MCL 40, on the other hand, controls the auxiliary functions of machine tool 18.

Reference numeral 42 designates the bidirectional CW interface between the NC 38 and the MCL 40.

Figure 3:
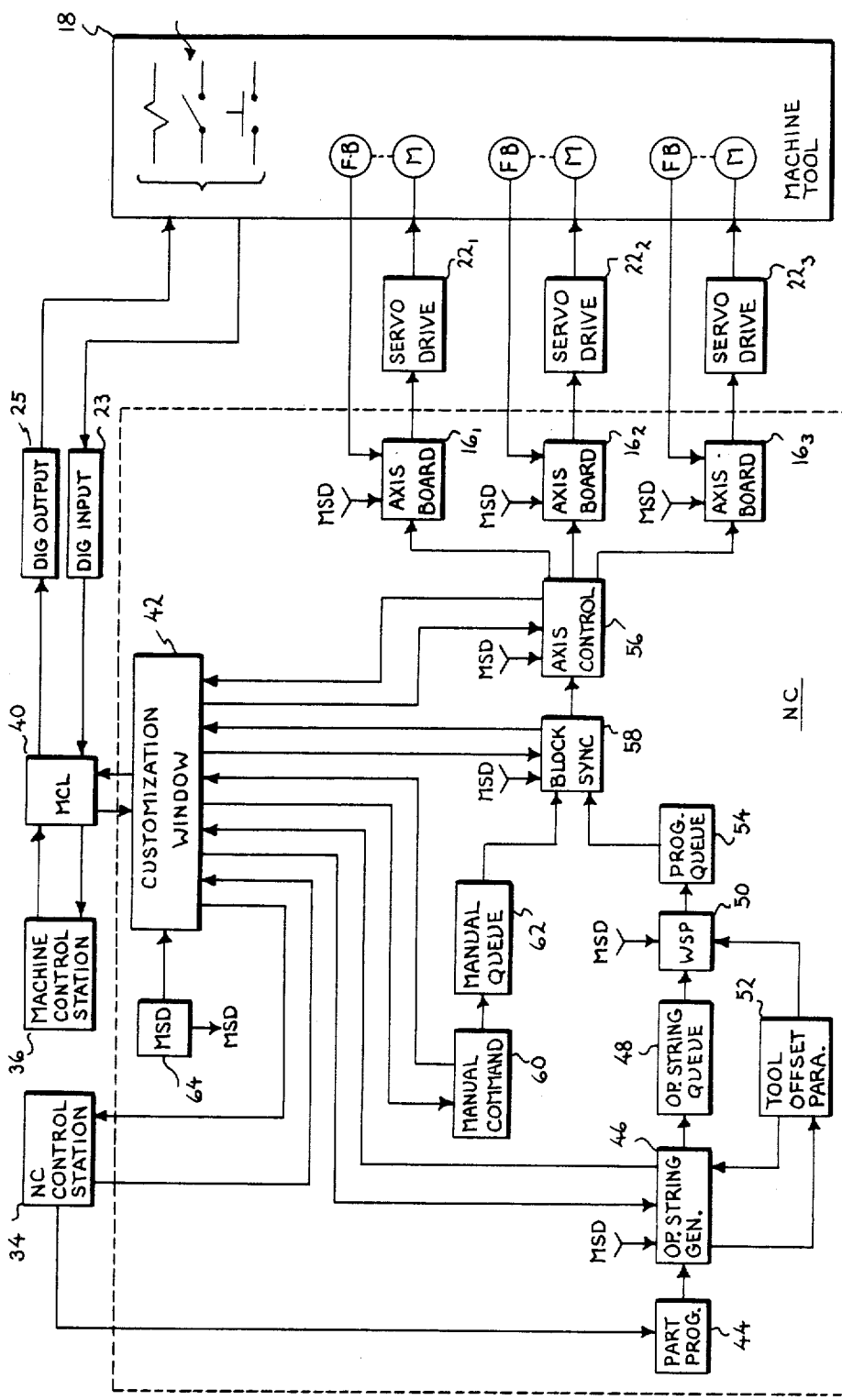
FIG. 3 is a functional block diagram further illustrative of the subject invention as it relates to the coordinated control of the CNC system by the MCL and NC.

Prior to considering the details of the software of which the customization window (CW) 42 interface is configured, reference will first be made to FIG. 3 which is intended to further illustrate the manner in which the customization window 42 links the major functional parts of the NC 38 to the MCL 40. As shown, reference numeral 44 indicates a part program which, for example, is stored in the non-volatile memory 28 shown in FIG. 1. The stored part program 44 is read out for execution in a plurality of code statements or blocks from which operational strings are generated in software by an operational string generator 46. These codes are fed to an operational string queue 48 where they are assembled in a predetermined sequential order and operated upon by software implemented work surface programming (WSP) logic 50 where, as the name suggests, modifies the operational string statements to accommodate a particular type of work surface. Additionally, a set of tool offset parameters are stored in memory as shown by reference numeral 52 where they are subsequently used by the operational string generator 46 and the work surface programming logic functional block 50 to make proper allowances for the geometry of the tool utilized in the machine tool 18. The tool offset parameters are initially fed to the memory location 52 from the NC control station 34 and the customization window 42. The operational string codes thus modified are applied through a program queue 54 where they are fed to an axis control 56 through synchronization software means referred to as the block sync 58. The block sync 58 and axis control 56 software are coupled to the software of the axis boards $16_1$, $16_2$ and $16_3$ where the program blocks are decoded and suitable electrical signals are generated to operate the servo drives $22_1$, $22_2$ and $22_3$. Although three axes are shown being controlled, in FIG. 3 one or more additional axis drives can be implemented to provide, for example, tilt of the work table holding the workpiece and/or for providing a rotation of the table. In each case, the servo drive couples to a respective electric motor M which is coupled to an electrical feedback generator FB and which in turn is coupled back to the respective axis board.

Additionally, manual commands shown by reference numeral 60 are inputted and stored, for example, in the RAM 12 shown in FIG. 1, having been entered from either the machine control station 36 and the MCL software 40 or the NC control station 34 via the customization window software 42. The stored manual commands are fed out in blocks through a manual queue shown by reference numeral 62 where they are applied to the block sync software 58 and then to the axis control software 56. The MCL 40, on the other hand, provides digital outputs to auxiliary function implementation hardware 21 of the machine tool 18 by means 25 while receiving digital inputs therefrom by means 23.

As evidenced by reference numeral 64, the NC 38 also includes the machine set up data (MSD) data tables which are stored, for example, in the non-volatile memory 28 shown in FIG. 1 and, as is well known, are required during program execution in order to tailor the control provided by the NC 38 to the particular machine tool 18 with which it is being utilized. The MSD data stored is thus fed to the operational string generator 46, the WSP logic 50, the block sync 58, the axis control 56, and the axis boards $16_1 \ldots 16_3$.

Insofar as it relates to this invention, a part program in its source code format is converted by the operational string generator 46 into two main portions, a main record and an axis record. The main record consists of the statement of sequence number, preparatory commands, e.g. coolant control (M code), spindle speed (S code), tool type (T code), etc. as well as feedrate. The axis record, moreover, contains statements as to the movements along X, Y and Z axes, for example, the travel distance required, as well as data concerning the tool offsets.

With respect to the MCL 40, its software consists of a series of procedures written in a programmable control language similar to PASCAL. These procedures are entered into the system in source code form and compiled there into machine code form. The MCL procedures are executed on a periodic basis, being initiated in response to periodic calls from the NC 38 following an initialization procedure called by the NC to initialize the MCL following the turn on of power. Each such execution is called a solution sweep. During each solution sweep, following a call from the NC 38, the MCL procedures make decisions and perform the actions, including the customization window routines to be set forth below, that are needed at that instant in time and then return control to the NC 38. The logical decisions that are made by the MCL procedures during each solution sweep are based on the digital inputs from the machine tool 18, the inputs from the machine control station 36 and the information that is retrieved from the NC 38 through the customization window 42. The results of these decisions take the form of digital outputs to the machine tool 18 through the functional block 25, outputs to the machine control station 36 and commands to the NC 38 through the customization window 42.

Directing attention now to the customization window 42, this functional block comprises a software implemented bidirectional interface, uniquely defined, whereby the MCL 40, implemented in software, is able under conditions dictated by the NC 38 to access the NC also implemented in software, and initiate different commands or to receive specified information therefrom, such as part program, data, canned cycle information, axis data information, etc. The CW 42, in effect, acts as an interlocutor between the MCL and NC 40 and 38. These controls, moreover, interact concurrently in multiplexed real time to control the machine tool 18, in a well known manner.

The customization window, as noted, is comprised of a series of functions, procedures, and flags, which are selectively actuated during each solution sweep. The functions and procedures are implemented in three sets of plural routines entitled, CUSTOMIZATION ROUTINES, MACHINE SETUP DATA ROUTINES, and OPTION VALIDATION ROUTINES while the flags constitute a set of status flags entitled NC STATUS FLAGS. The functions and procedures are computer programming terms taken from PASCAL programming notation which is set forth, for example, in detail in a textbook entitled, "PASCAL, An Introduction To Methodical Programming", by W. Findlay, et al., Computer Science Press, 1978. A "function" constitutes a program routine or portion thereof which takes one or more given values or the absence thereof and returns a resultant value to be subsequently used, whereas a "procedure" is merely a set of operational steps that does not itself return a value.

The CUSTOMIZATION ROUTINES comprise a plurality of separate and distinct functions and procedures which constitute primarily calls from the MCL 40 to the NC 38 to establish prescribed operational modes or states in the NC to couple input information to the NC, to command actions to be performed by the NC and retrieve information from the NC related to these states and actions. The MACHINE SETUP DATA ROUTINES comprise a series of functions and procedures, but mostly functions, asking for particular alphanumeric values out of the MSD tables 64 located in the NC 38. The OPTION VALIDATION ROUTINES are a series of routines, all of the function type, which allows the MCL 40 to check on the presence or absence of optional control features which are present in the NC 38. The NC STATUS FLAGS, on the other hand, comprise BOOLEAN flags which are conveyed from the NC 38 back to the MCL 40 to indicate the status of various conditions and processes in the NC 38 during system operation.

The CUSTOMIZATION ROUTINES comprise a set of functions and procedures which form the primary interface between the MCL 40 and the NC 38. These functions and procedures are tabulated simply by title in the following Table No. 1; however, their explanations and statements in PASCAL type programming language are set forth in Appendix No. 1 which appears on the above referenced microfiche material and which is intended to form a portion of this specification.

TABLE NO. 1

Customization Routines

ACTIVE CSS LIMIT (Active Constant Surface Speed Limit)
ACTIVE CSS RPM (Active Constant Surface Speed)
ACTIVE DISP PAGE (Active Display Page)
ACTIVE FEEDRATE
ACTIVE G CODE
AT ERROR LIMIT
AUTO MODE SELECT
AXIS STATUS
AXIS IN POSITION
AXIS IN ZONE
AXIS MOVE ABS (Axis Move Absolute)
AXIS MOVE FORCED
AXIS MOVING
AXIS OUT OF SYNC
AXIS REFERENCED
AXIS STOP
BCD TO BINARY (Binary Coded Decimal To Binary)
BINARY TO BCD
BLK POST OFF (Block Postlude Off)
BLK POST ON (Block Postlude On)
BLOCK DELETE OFF
BLOCK DELETE ON
BYTE TO FLOAT
CANCEL INITIATE
CCY MCL STEP NUM (Canned Cycle MCL Step Number)
CCY POST OFF (Canned Cycle Postlude Off)
CHANGE EOT LIMIT (Change End of Travel Limit)
CHUCK SELECTED
CLEAR INITIATE
CLOSE PSN LOOP (Close Position Loop)
CSS DIRECTION (Constant Surface Speed Direction)
CSS ENABLE (Constant Surface Speed Enable)
CYC START INIT (Cycle Start Initiate)
CYCLE STOP OFF
CYCLE STOP ON
DELETE CUST MSG (Delete Custom Message)
DELETE FILE MSG (Delete File Message)
DIRECTION NEG (Direction Negative)
DISP CUST LINE (Display Custom Message)
DISP FILE MSG (Display File Message)
DISP PAGE LINE (Display Page Line)
DISP PAGE RETURN (Display Page Return)
DISP PAGE SELECT (Display Page Select)
DISP SEL LOCK (Display Select Lock)
DISP SEL UNLOCK (Display Select Unlock)
DISTANCE TO GO
DISTANCE ZERO
DRY RUN OFF
DRY RUN ON
ENTER TEMP COMP (Enter Temperature Compensation)
EXPL BYTE CONTIG (Explode Byte Contiguous)
FDBK DEVICE PSN (Feedback Device Position)
FILE MSG INSERT (File Message Insert)
GET SAVE BOOL (Get Saved Boolean Value)
GET SAVE FLOAT (Get Saved Floating Point Value)
GET SAVE INT (Get Saved Integer Value)
GRID AXIS INIT (Grid Axis Initiate)
IMPL BYTE (Implode Byte)
IMPL BYTE CONTIG (Implode Byte Contiguous)
INCR FEED INIT (Incremental Feed Initiate)
INHIB DRILL OFF (Inhibit Drill Off)
INHIB DRILL ON (Inhibit Drill On)
INQUIRE CANCEL
INQUIRE PROMPT
INQUIRE RESPONSE
INT TO FLOAT (Integer To Floating Point)
JOG MOVE INIT (Jog Move Initiate)
JOG STOP
KEYBD LOCK (Keyboard Lock)
KEYBD UNLOCK (Keyboard Unlock)
M CODE 1
M CODE 2
M CODE 3
MACH PSN MCL (Machine Position MCL)
MACH PSN PROG (Machine Position Program)
MANUAL MODE SEL (Manual Mode Select)
MCL CANCEL DONE (MCL Cancel Complete)
MCL CLEAR DONE (MCL Clear Complete)
MCL DATA 1
MCL DATA 2
MCL FEEDHOLD OFF
MCL FEEDHOLD ON
MCL GET OEM DATA (MCL Get Original Equipment Manufacturer Data)
MCL MFO OFF (MCL Manual Feedrate Override Off)
MCL MFO ON (MCL Manual Feedrate Override On)
MCL MFO VALUE (MCL Manual Feedrate Override Value)
MCL SSO OFF (MCL Spindle Speed Override Off)
MCL SSO ON (MCL Spindle Speed Override On)
MCL SSO VALUE (MCL Spindle Speed Override Value)
MCI MODE SELECT (Manual Data Input Mode Select)
MIN MAX RPM (Minimum & Maximum Spindle Speed)
MIRROR OFF
MIRROR ON MOTION INHIB OFF (Motion Inhibit Off)
MOTION INHIB ON (Motion Inhibit On)
ON REF SWITCH (On Reference Switch)
OPEN PSN LOOP (Open Position Loop)
OPER FDHOLD OFF (Operator Feedhold Off)
OPER FDHOLD ON (Operator Feedhold On)
OPTION STOP OFF
OPTION STOP ON
ORIENT ANGLE
PARAMETER CHANGE (Parameter Value Change)
PARAMETER VALUE (Current Parameter Value)
PRELUDE OFF
PRELUDE ON
PROG NUM SELECT (Part Program Number Select)
PROG REFERENCE (Part Program Reference)
PROG REL PSN (Part Program Relative Position)
PROG SEARCH SKIP (Program Search Skip)
PROGRAM REWIND (Part Program Rewind)
PUT SAVE BOOL (Put Saved Boolean Value)
PUT SAVE FLOAT (Put Saved Floating Point Value)
PUT SAVE INT (Put Saved Integer Value)
REF AXIS INIT (Reference Axis Initiate)
RETRACE BY BLKS (Retrace By Blocks)
RETRACE OFF
RETRACE ON
RUN ACTIVE CYCLE
S CODE
SECONDOFFSET OFF (Second Offset Off)
SECONDOFFSET ON (Second Offset On)
SERVO STOP OFF
SERVO STOP ON
SET AXIS ZERO
SINGLE MODE SEL (Single Mode Select)
SPIN AXIS RUN (Spindle Axis Run)
SPIN IOC RUN (Spindle Input/Output Controller Run)
SPINDLE RPM (Spindle Speed)
T CODE
TEST OFF
TEST ON
THC POST OFF (Threadcutting Postlude Off)
THC POST ON (Threadcutting Postlude On)
TRAV POST OFF (Traverse Postlude Off)
TRAV POST ON (Traverse Postlude On)
TRP OFF (Tool Recovery Procedure Off)
TRP ON (Tool Recovery Procedure On)

As previously noted, these routines, in most instances, are executed in response to calls from the MCL 40 to the NC 38 to establish modes or operational states in the NC 38 and can command actions such as axis motion to take place and can retrieve information from the NC 38 under controlled conditions. The functions implemented in the CUSTOMIZATION ROUTINES return five different types of values, namely; NC responses, integer, Boolean, float, and tool code values. With the exception of NC responses, the other values are conventional, however, NC responses result from a command of a mode change or an action from the MCL 40 to the NC 38. The customization routines providing NC responses returns one of three values to the MCL 40 in accordance with the following statement:

NC RESPONSES = (FAILURE, SUCCESS, BUSY). A returned value of FAILURE means that the NC 38 has rejected the request made by the MCL 40. For example, if the MCL calls for a JOG MOVE INIT (jog move initiate) function at a time when jogging is not permitted, then the JOG MOVE INIT function will return a value of FAILURE. A return value of SUCCESS means that the request made by the MCL 40 has been accepted by the NC 38 at a level that can be checked during the present MCL solution sweep. The request may still be rejected in a different way after the NC 38 has had time to make further checks. For example, if the MCL 40 calls for the INCR FEED INIT (incremental feed initiate) function at a time when incremental feeding is permitted, the function's returned value will be SUCCESS; however, if after processing the move, the NC 38 finds that the axis will cross a safe zone boundary; the move will be inhibited. A return value of BUSY means that a data area or a routine within the NC 38 is in use at the time when the MCL's call tried to use the same data area or routine, in which case the MCL will normally return the call again during the next solution sweep.

It should be noted that the CUSTOMIZATION ROUTINES additionally include a series of functions which include the terms "Prelude" and "Postlude". These functions result from a desire on the part of the system user via the MCL 40 to hold up a programmed motion or inhibit transfer of a part program block to an active state, i.e. when block execution takes place. Most often these functions are initiated by M code (coolant control), S code (spindle speed) and T code (tool selection) commands in a part program block. Prelude functions must operate before a motion command appears in a block and may be viewed as a motion inhibit if axis motion is commanded when a block is going active. Postlude functions operate after motion in a block is complete and before the next block transfers to an active state.

In the NC 38 before any programmed axis commands in the part program block going active are sent to the axis boards $16_1 \ldots 16_n$, the NC software checks for Prelude data in the block. If no Prelude data is encountered in the active block, then that block is allowed to execute in a normal manner, meaning axis motion will take place if programmed in the block. If Prelude data is encountered in the active block, then the NC software does not allow any program motion to take place by not sending commands to the axis boards. Instead, the NC 38 goes into a Prelude WAIT state. In this case the NC 38 sets up Prelude data and status flags for the MCL 40. When the flags are set, the NC 38 then forces a Prelude available MCL solution sweep which is termed a "strobe sweep". It is during this strobe sweep that the MCL 40 determines that a Prelude or Postlude function is required and sets Prelude, Postlude, or both accordingly.

At the end of a strobe sweep, if Prelude is set, the NC 38 remains in the Prelude WAIT state until the MCL 40 clears Prelude and only then does it allow any program motion in the active block to take place. If Prelude is not set after the strobe sweep, the NC goes out of the WAIT state and allows normal execution of the active block. Thus by setting Prelude, the MCL 40 prevents any program motion in the active block from taking place. When an active block is finished and all axes are in position or at a distance zero, if Postlude is encountered, the NC 38 does not start transfer of the next block to active until the MCL clears Postlude. Thus by setting Postlude, the MCL 40 inhibits transfer of the next part program block to the active state where execution then takes place.

The following examples will now be considered for purposes of illustrating how several CUSTOMIZATION ROUTINES operate to accomplish a specific task. First, in the event that a tool change command is encountered by the NC 38 in a part program, one or more axes would normally have to be moved to a predetermined position prior to making the tool change; however, any motion of an axis will not be allowed to take place until the present motion commanded is completed. Thus when the NC 38 processes or activates a part program block containing a tool change command in the form of an M code together with axis movement dimensions and feedrate, the command will be made available to the MCL 40 through the M Code 1 function. The NC 38 will also set a BLK PREL AVAIL (block prelude available) flag which the MCL program is continuously checking during successive solution sweeps. When the flag has been found to be set, the MCL 40 will call the BLK POST ON (block postlude on) function to request a Postlude. When the axis motion in the block which contained the tool change command is completed, the NC 38 will stop transferring data and will set the BLK POST ACTIVE (block postlude active)flag. When the MCL 40 detects the "block postlude active" flag it will call the ACTIVE FEEDRATE function to retrieve from the NC 38 the currently active feedrate from the active axis record in the NC part program block. The NC 38 accordingly returns that value to the MCL 40.

Following this the MCL 40 will make a call, in a subsequent solution sweep, for the AXIS MOVE ABS (axis move absolute) function that includes a command to the NC 38 in three parameters. The first one is the axis number indicating which axis is to be moved. The second is the destination distance to be moved and the third is the feedrate which was just retrieved from the NC 38. This function will cause the NC 38 to "build" a new axis record which will be processed causing appropriate commands to be sent to a particular axis board $16_1 \ldots 16_n$ to cause motion along the axis desired. The AXIS MOVE ABS function, however, is an "NC responses function" and accordingly the NC 38 will return a value of either FAILURE, SUCCESS or BUSY to the MCL 40. If axis movement is not permitted at this point, the returned value will be FAILURE and the MCL must call for a corrective action. If, however, the return is SUCCESS the MCL 40 immediately calls the AXIS STATUS function to retrieve the current status of the particular axis whereupon the NC 38 returns a "request pending" response. As the NC 38 executes the command to move the axis, it may detect a problem e.g. an end of travel boundary is being violated, in which case it will refuse to move the axis and will set the axis status to "request rejected". If no problem is encountered, it will enable the move to take place and will set the axis status to "request accepted" and when the move is completed it will set the axis status to "action complete".

Since this processing for the axis move and the axis move itself takes a finite period of time, the MCL 40 repeatedly calls the AXIS STATUS function in successive solution sweeps to monitor the status of the request that was made. When an "action complete" response is received from the NC 38, the MCL 40 concludes that the required axis has been moved to the tool change position. At that point the MCL 40 calls for the additional steps that are needed to run the tool changer to effect a tool change. After this is completed, the MCL 40 calls the BLK POST OFF (block postlude off) function which will allow the NC 38 to resume normal processing of part program blocks.

A second example involves a feature of the system called "feedhold" which permits axis motion to be stopped when the MCL 40 detects a condition where axis motion should be temporarily suspended such as when a guard door has been opened on the machine tool 18. The MCL 40 will call the function MCL FEEDHOID ON, with the type of feedhold condition being identified. The NC 38 in turn will "build" a command for the axis boards $16_1 \ldots 16_n$ which is transmitted thereto causing all axis motion to cease. When the condition has been corrected, the MCL 40 senses, for example, that the door has been closed and thereafter calls the function MCL FEEDHOLD OFF whereupon the NC 38 will build a command allowing axis motion to resume.

A third example involves the detection of a broken tool on the part of the MCL 40 which must be communicated to a machine operator via the NC 38. Assuming that there is a broken tool detector, not shown, on the machine tool 18 which is adapted to provide a digital input to the MCL through the block 23 shown in FIG. 3 and that such has occurred, the MCL 40 will call the DISP PAGE SELECT (display page select) procedure asking the NC 38 to change the display on a CRT, for example, to a blank "page" of an operator viewable message display. This procedure is called with a page number as a parameter and specifies which blank page is to be used. Next the MCL 40 calls for the DISP PAGE LINE (display page line) function whereupon the MCL supplies a string of characters, e.g. "broken tool" to be displayed on the CRT display. Following this the MCL 40 calls the INQUIRE PROMPT function to provide a prompting message to the operator and then wait for a response from the operator. The message might very well be a statement telling the operator to check the part being fabricated and decide whether or not the part program can continue. This function expects the operator to respond in some fashion such as "yes" or "no" and accordingly starts checking an NC status flag called INQUIRE COMPLETE. When this flag is set by the NC 38, it is an indication that the operator has responded to the query. The MCL 40 then calls the INQUIRE RESPONSE procedure to retrieve the response from the operator and decide what action to take next. The MCL 40 next calls the DISP PAGE RETURN (display page return) procedure to cause the display to return to the "page" the operator had been watching and depending on the operator's response either advise him to repair the tool and continue the part program or replace the part and start over.

The second set of customization window routines identified as the MACHINE SETUP DATA ROUTINES are adapted to provide access by the MCL 40 to the machine setup data (MSD data) that is stored in the NC 38. The functions implemented in these routines return values of nine different types including: integer, character, resolution, motion, Boolean, float, units, word, and measure values. The following Table 2 is a tabulation of the titles of these functions and procedures while an explanation and procedural statement thereof is set forth in the Appendix II which appears in the attached microfiche and is intended to form a portion of this specification.

TABLE NO. 2

Machine Setup Data (MSD) Routines

MSD AXIS BOARD (Axis Board Number)
MSD AXIS GROUP (Axis Group Number)

MSD AXIS LET INC (Axis Letter Increment)
IMSD AXIS LETTER (Axis Letter — Primary Address)
MSD AXIS RESOLU (Axis Interpolation Resolution)
MSD AXIS TYPE
MSD BOARD ELEMENT
MSD BOOL TABLE (Boolean Table)
MSD CHAR TABLE (Character Table)
MSD ERROR LIMIT
MSD FEEDBK CNTS (Feedback Cycle Counts)
MSD FEEDBK ENCOD (Feedback Encoder)
MSD FEEDBK MULTI (Feedback Multiplier)
MSD FEEDBK RATIO (Feedback Gear Ratio)
MSD FEEDBK UNITS (Feedback Units)
MSD FLOAT TABLE
MSD FPR RATE (Feed Per Revolution Rate)
MSD G70 FORMAT
MSD G70 LEAD FMT (G70 Thread Lead Format)
MSD G71 FORMAT
MSD G71 LEAD FMT (G71 Thread Lead Format)
MSD GRID OFFSET
MSD GRID ZERO REF (Grid Zero Reference)
MSD HI JOG RATE (High Jog Rate)
MSD INC FD RATE (Incremental Feed Rate)
MSD INTEG LETTER (Integrand Letter)
MSD INTERP MULTI (Interpolation Multiplier)
MSD INT TABLE (Integer Table)
MSD IN PSN TIME (In Position Time)
MSD IN PSN ZONE (In Position Zone)
MSD LO JOG RATE (Low Jog Rate)
IMSD MAX BACKOFF (Maximum Reference Backoff Distance)
MSD MAX DA FPM (Maximum Digital to Analog Feed Per Minute)
MSD MIN BACKOFF (Minimum Reference Backoff Distance)
MSD MIN MOVE DEG (Minimum Movement Degrees)
MSD NUM OF AXES (Number of Axes)
MSD NUM PROG AXES (Number of Programmable Axes)
MSD OUT OF SYNC
MSD PRIME EOT 1 (Primary End of Travel—Axis #1)
MSD PRIME EOT 2 (Primary End of Travel—Axis #2)
MSD PROG AXIS (Programmable Axis)
MSD PROG MULTI (Program Multiplier)
MSD PROG REF OK (Programmable Reference Permitted)
MSD REF DIR (Reference Direction)
MSD REF POSITION (Reference Position)
MSD REF RATE (Reference Rate)
MSD REF REQD (Reference Required)
MSD REF SW DIST (Reference Switch Distance)
MSD REV ERROR (Reversal Error)
MSD SECOND EOT 1 (Secondary End of Travel—Axis #1)
MSD SECOND EOT 2 (Secondary End of Travel—Axis #2)
MSD SECONDOFFSET (Second Offset)
MSD SHORT PATH
MSD SPIN DA AXIS (Spindle Digital to Analog Axis)
MSD SPIN FB AXIS (Spindle Feedback Axis)
MSD SPIN ORIENT (Spindle Orientation)
MSD TRAV RATE (Traverse Rate)
MSD UDA DISTANCE (Unidirectional Approach Distance)
MSD UNITS
MSD USE AUX RATE (Use Auxiliary Feedrate)

With respect to the MACHINE SETUP DATA (MSD) routines, the MSD BACKOFF (Maximum reference backoff distance) routine will be considered for purposes of providing an illustrative example of this type of customization window routine. The MCL 40 includes a software section for providing axis referencing which comprises a means for determining the exact position of an axis in relation to a reference limit switch inasmuch as the positional feedback device coupled to the axis drive motor and which comprises a rotational resolver, for example, only provides exact information for each revolution but does not indicate the number of revolutions made. Accordingly, in the event the operator wishes to reference an axis, a push-button, for example, on the machine control station 36 would be activated which the MCL 40 detects. The MCL 40 next checks to see whether or not the axis is already on the reference limit switch by means of sensing a digital input indicative thereof conveyed by the digital input block 23. If the axis is already at the limit switch an axis reference is not possible in that position and must therefore back off from the switch before proceeding further. The MCL 40 would call the MAX BACKOFF function which asks the MSD table 64 in the NC 38 to return a distance number that is the amount the machine setup data table prescribes is the allowable move distance for backing off of the reference switch. Since this distance varies from axis to axis, a parameter indicating the axis involved is passed by the MCL 40. After the MSD MAX BACKOFF function is called and the backoff distance is received, the MCL 40 calls the AXIS MOVE FORCED function of the customization routines to cause the axis to move the distance specified via the MC 38. Following this the MCL 40 can then request the axis reference by calling the REF AXIS INIT (reference axis initiate) routine of the customization routines.

With respect to the OPTION VALIDATION ROUTINES, the functions listed in Table No. 3 below provide a means for the MCL 40 to check from time to time and particularly at the time of system installation on any particular optional feature to determine whether or not it is present in the NC 38 software. The routines, moreover, are further illustrated in Appendix III appearing in the attached microfiche forming a part of this specification and which indicate the type of functions included. In most cases, these are Boolean functions that return a TRUE answer if the option is present and FALSE answer if the option is not present. Some functions return control type and integer values in an enumeration. These enumerations are defined in Appendix III under the functions where designations have been prescribed.

TABLE NO. 3

Option Validation Routines

OPT 3 AX CONTOUR (Axis Contouring—Three Axis)
OPT-4th-OFFSETS (Axis Offsets—Fourth Axis)
OPT AXIS ALIGN (Axis Alignment Compensation)
OPT BEAM SAG (Beam Sag Compensation)
OPT CLM (Closed Loop Machining)
OPT CLM REPORT (Closed Loop Machining Report Generation)
OPT CONTROL OPT CSS (Constant Surface Speed)
OPT DNC STATUS (Direct Numerical Control Status Report)
OPT FIFTH AXIS
OPT FIXT OFF QTY (Fixture Offset Quantity)
OPT FOURTH AXIS
OPT FULL CIRCLE
OPT INCH METRIC
OPT LEAD SCREW
OPT LEGAL G CODE
OPT MCL MEMORY (Machine Control Logic Memory)
MID TAPE STR (Mid Tape Startup)
OPT MPG (Manual Pulse Generator)
OPT OFFSET QTY (Offset—Quantity)
OPT PARAM SUBS (Parametric Subroutines)
OPT PART TIME (Part Time Monitor)
OPT PROGRAM MEM (Program Memory)
OPT RETRACE
OPT SAFE ZONE
OPT SECONDOFFSET (Second Offset)
OPT SIXTH AXIS
OPT SPIN GROWTH (Spindle Growth Compensation)
OPT SPIN ORIENT (Spindle Orientation)
OPT STOR FRO SSO (Stored Feedrate & Spindle Speed Override)
OPT THIRD AXIS
OPT TOOL TIME (Tool Time Monitor)
OPT TRP (Tool Recovery Procedure)

To illustrate an example of the OPTION VALIDATION ROUTINES, the OPT FOURTH AXIS function will be considered. Where, for example, the machine tool 18 is one which incorporates a pallet changing feature, the axes must be moved to some specific location before the pallet which carries the workpiece can be loaded on to or off the machine tool to a separate stand. The MCL 40 will, during a predetermined solution sweep, call the OPT FOURTH AXIS function to query the NC 38 as to the existence of a fourth axis such as a rotating table, on the machine tool. If the returned value is "true", the MCL 40 will then make a call for the AXIS MOVE ABS (Axis move absolute) function of customization routines for the fourth axis to execute and rotate the table to a zero position before continuing with the pallet changing operation. If the machine tool 18 does not contain a fourth axis, then that part of MCL solution sweep will be skipped over in the process of performing a pallet change.

With respect to the NC status flags, some of which have already been mentioned above, these constitute a plurality of flags which are made available to the MCL 40 from a status array, not shown, which is included in the NC 38. These flags, however, are Boolean flags that convey to the MCL 40 the status of the various conditions that exist on the NC side of the CNC system so that a coordinated system operation is effected. Some of these flags are associated with "modal" conditions and as a consequence the state of the flags will change whenever the state of the modal condition changes. Other NC status flags are associated with part program processing in the NC 38 and are synchronized with the MCL solution sweeps. The NC status flags are identified and tabulated in the following Table 4, but are additionally set forth and described in Appendix IV, appearing in the referenced microfiche material and is intended to form a part of this specification.

TABLE NO. 4

NC Status Flags

AXIS GP 1 IN PSN (Axis Group 1 In Position)
AXIS GP 2 IN PSN (Axis Group 2 In Position)
AXIS GP 3 IN PSN (Axis Group 3 In Position)
AXIS GP 4 IN PSN (Axis Group 4 In Position)
CSS ACTIVE (Constant Surface Speed Active)
CYC START LT ON (Cycle Start Light On)
CYC START LT FL (Cycle Start Light Flash)
FDHOLD LT ON (Feedhold Light On)
FDHOLD LT FLASH (Feedhold Light Flash)
FDHOLD LT PULSE (Feedhold Light Pulse)
INQUIRE COMPLETE
INQUIRE SUCCESS
NC C S CANCEL (NC Control Station Cancel)
NC C S CLEAR (NC Control Station Clear)
NC CANCEL DONE (NC Cancel Completed)
NC CLEAR DONE (NC Clear Completed)
PROG SELECT DONE (Program Select Completed)
PROG SELECT SUCC (Program Select Success)
REQD REF DONE (Required Reference Completed)
RETRACE LIGHT ON
RETRACE SUCCESS
REWIND COMPLETE
SEARCH COMPLETE
SEARCH SUCCESS
SERVO STOP ACTV (Servo Stop Active)
TRP ACTIVE (Tool Recovery Program Active)
TRP ACCUM ACTIVE (TRP Accumulate State Active)
TRP LIGHT ON
TRP LIGHT FLASH
TRP RETRACT DONE (TRP Retract Completed)
BLK POST ACTIVE (Block Postlude Active)
THC POST ACTIVE (Threadcutting Postlude Active)
TRAV POST ACTIVE (Traverse Postlude Active)
ICCY PREL AVAIL (Canned Cycle Prelude Available)
THC PREL AVAIL (Threadcutting Prelude Available
TRAV PREL AVAIL (Traverse Prelude Available)
BLK PREL AVAIL (Block Prelude Available)
PREL RPT AVAIL (Prelude Repeat Available)
P P DATA ENC (Part Program Data Encountered)
M1 ENC (M1 Code Encountered)
M2 ENC (M2 Code Encountered)
M3 ENC (M3 Code Encountered)
MCL DATA 1 ENC (MCL Data 1 Field Encountered)
MCL DATA 2 ENC (MCL Data 2 Field Encountered)
ORIENT ANGLE ENC (Spindle Orientation Angle Encountered)
PROG REF ENC (Program Reference Encountered)
SPIN SPEED ENC (Spindle Speed Command Encountered)
SPIN LIMIT ENC (Spindle Speed Limit Encountered)
SURF SPEED ENC (Surface Speed Command Encountered)
T ENC (Tool Code Encountered)
CCY DATA ENC (Canned Cycle Data Encountered)
CCY START SPIN (Canned Cycle Start Spindle)
CCY STOP SPIN (Canned Cycle Stop Spindle)
CCY REV SPIN (Canned Cycle Reverse Spindle)
CCY UNREV SPIN (Canned Cycle Unreverse Spindle)
CCY ORIENT SPIN (Canned Cycle Orient Spindle)
CCY AXIS FEEDING (Canned Cycle Axis Feeding)

CCY FEEDING DONE (Canned Cycle Feeding Done)
CCY GO TO DEPTH (Canned Cycle Go To Depth)
CCY GODEPTH DONE (Canned Cycle Go To Depth Completed)
CCY AT DEPTH (Canned Cycle At Depth)
CCY SSO 100 (Canned Cycle Spindle Speed Override to 100)
CCY SSO 100 DONE (Canned Cycle Spindle Speed Override to 100% Completed)
CCY START TMR1 (Start Canned Cycle Timer 1)
CCY START TMR2 (Start Canned Cycle Timer 2)
CCY OPER FDHOLD (Canned Cycle Operator Feedhold)
CCY MCL STEP (Canned Cycle MCL Step)

As an example, the NC 38 conveys to the MCL 40 the type of Prelude data that is available during a solution sweep by setting such flags as: P P DATA ENC (part program data encountered), M1 ENC (M1 code encountered), ORIENT ANGLE ENC (spindle orientation angle encountered), SPIN SPEED ENC (spindle speed command encountered). The NC 38 also then follows this up by setting the BLK PREL AVAIL (block prelude available) flag to indicate that the flags referred to above have been set. This is a master flag which is checked by the MCL 40 in order to avoid testing many different other non-essential flags on every solution sweep.

Thus the present invention comprises a plurality of routines and flags which form the one and only communications link between the MCL 40 and the NC 38 and in doing so provides restrictions on the information and control that the MCL can exert on the NC. The MCL can do precisely what each of these functions and procedures provide it with the capability to do and nothing more.

While there has been shown and described what is at present considered to be the preferred embodiment of the present invention, modifications thereto will readily occur to those skilled in the art. It is not desired, therefore, that the invention be limited to the specific implementation shown and described, but it is intended to cover all such modifications, alterations and changes falling within the true spirit and scope of the invention and defined in the appended claims.

What is claimed is:

1. A computer numerical control system including coordinated machine control logic means and numerical control means for controlling the operation of a machine tool in the performance of a specified operation with respect to a workpiece, comprising:
   a bus connected central processing unit and a memory having a plurality of programs stored therein, said programs including,
   (a) a series of routines for implementing said numerical control means and being operable to control plural axis motions of said machine tool and being defined as the numerical control,
   (b) a series of routines for implementing said machine control logic means and being operable to control the auxiliary functions of said machine tool and being defined as the machine control logic, and
   (c) a series of routines and status flags for implementing a customization window interface between said machine control logic and said numerical control, said series of routines being accessible for execution by the central processor in response to execution of the machine control logic and said status flags being provided by the numerical control in response to the execution of said routines whereby the machine control logic controls the numerical control through the customization window under predetermined conditions so that coordination is attained therebetween.

2. The system as defined by claim 1 wherein said series of routines implementing said customization window interface comprises a set of customization routines in the form of predetermined functions and procedures which comprise calls from said machine control logic to said numerical control to establish prescribed modes or operational states in said numerical control.

3. The system as defined by claim 2 wherein said set of customization routines additionally include a plurality of routines for commanding predetermined actions to be performed by said numerical control in response to calls from said machine control logic.

4. The system as defined by claim 3 wherein said customization routines additionally include a plurality of routines for sending specified information to and retrieving specified information from said numerical control which can be related to said modes or states and actions requested from the machine control logic in response to calls from said machine control logic.

5. The control system as defined by claim 1 wherein said series of routines implementing said customization window interface comprises a set of machine setup data routines including a series of functions and procedures whereby said machine control logic requests particular alpha-numeric machine setup values stored in said numerical control to be conveyed thereto.

6. The system as defined by claim 1 wherein said series of routines implementing said customization window interface comprises a set of option validation routines including a plurality of functions permitting said machine control logic to query said numerical control on the presence or absence of optional control features present in the routines of said numerical control.

7. The control system as defined by claim 1 wherein said series of status flags implementing said customization window interface comprise a plurality of Boolean flags conveyed from said numerical control back to said machine control logic to indicate the status of various conditions and processes present in said numerical control during execution of selected ones of said programs.

8. A system as defined by claim 1 wherein said series of routines and status flags implementing said customization window interface comprise:
   (i) a set of customization routines comprising a plurality of separate and distinct functions and procedures which establish prescribed operational modes or states in said numerical control in response to calls from said machine control logic, command predetermined actions to be performed by said numerical control in response to calls from said machine control logic, couple input information to said numerical control from said machine control logic, and retrieve and send information from said numerical control to said machine control logic related to said modes, states and actions;
   (ii) a set of machine setup data routines comprising a plurality of functions and procedures whereby said machine control logic can request and receive predetermined alpha-numeric values of machine setup data from a machine setup data table in said numerical control;

(iii) a set of option validation routines comprising a plurality of routines enabling said machine control logic to query said numerical control on the presence or absence of optional control features which are present in the routines of said numerical control; and (iv) a set of status flags comprising a plurality of Boolean flags which are transmitted from said numerical control to said machine control logic to indicate the status of various conditions and processes in said numerical control during system operation.

9. The method for controlling the operation of a computer numerical control system for controlling the operation of a machine tool in the performance of specified operations with respect to a workpiece, comprising the steps of:

(a) executing a series of routines stored in a memory of a digital computer and controlling thereby plural axis motions of said machine tool, said routines being defined as the numerical control;

(b) executing a series of routines stored in the memory of said digital computer and controlling thereby auxiliary functions of said machine tool, said routines being defined as the machine control logic; and (c) executing a series of routines stored in the memory of said digital computer and generating a plurality of status flags for implementing a customization window interface between said machine control logic and said numerical control, said machine control logic thereby accessing and controlling the numerical control under predetermined conditions, said numerical control returning said status flags to said machine control logic for effecting a coordinated operation concurrently therebetween and performing thereby a specified operation on said workpiece.

10. The method as defined by claim 9 wherein said step of executing said series of routines implementing said customization window interface comprises executing a set of customization routines in the form of predetermined functions and procedures comprising calls from said machine control logic to said numerical control and establishing thereby prescribed modes or operational states in said numerical control.

11. The method as defined by claim 10 wherein said step of executing said set of customization routines additionally includes executing a plurality of routines and commanding thereby predetermined actions to be performed by said numerical control in response to calls from said machine control logic.

12. The method as defined by claim 11 wherein said step of executing said routines additionally includes the step of executing a plurality of routines and sending specified information to and retrieving specified information from said numerical control which is related to said modes or states and actions requested from the machine control logic in response to calls from said machine control logic.

13. The method as defined by claim 9 wherein said step of executing said series of routines implementing said customization window interface comprises executing a set of machine setup data routines including a series of functions and procedures, said machine control logic requesting thereby particular alpha-numeric machine setup values stored in said numerical control.

14. The method as defined by claim 9 wherein said step of executing said series of routines implementing said customization window interface comprises executing a set of option validation routines including a plurality of functions permitting said machine control logic to thereby query said numerical control on the presence or absence of optional control features present in the routines of said numerical control.

15. The method as defined by claim 9 wherein said step of generating said plurality of status flags implementing said customization window interface comprises generating a plurality of Boolean flags and indicating thereby the status of various conditions and processes present in said numerical control.

16. The method as defined by claim 9 wherein said steps of executing said series of routines and generating said plurality of status flags implementing said customization window interface comprises:

(i) executing a set of customization routines comprising a plurality of separate and distinct functions and procedures, thereby establishing prescribed operational modes or states in said numerical control in response to calls from said machine control logic, commanding predetermined action to be performed by said numerical control in response to calls from said machine control logic, coupling input information to said numerical control from said machine control logic, and retrieving and sending information from said numerical control to said machine control logic related to said modes, states and actions;

(ii) executing a set of machine setup data routines comprising a plurality of functions and procedures, said machine control logic thereby requesting and receiving predetermined alpha-numeric values of machine setup data from a machine setup data table in said numerical control;

(iii) executing a set of option validation routines comprising a plurality of routines thereby enabling said machine control logic to query said numerical control on the presence or absence of optional control features which are present in the routines of said numerical control; and (iv) generating a set of status flags comprising a plurality of Boolean flags and transmitting said flags from said numerical control to said numerical control logic, thereby iniicating the status of various conditions and processes in said numerical control during system operation.

17. A method for controlling the operation of a machine tool in the performance of specified operations with respect to a workpiece, comprising the steps of:

(1) controlling plural axis motions of said machine tool by a set of numerical control routines stored in and selectively executed by a digital computer;

(2) controlling the auxilliary functions of said machine tool by a set of machine control logic routines stored in and selectively executed in said digital computer; and (3) interposing a set of interface routines and generating a set of status flags communicated between said numerical control routines and said machine control logic routines for effecting a coordinated operation therebetween in effecting a specified operation on said workpiece, said interface routines being subject to call by said machine control logic routines for execution by said digital computer to provide commands effecting control of said axis motions depending on the operative status of said numerical control routines and said status flages being subject to change depending on the operative results produced by said numerical control routines.

18. A numerical control system for governing the operation of a machine tool in the performance of specified operations with respect to a workpiece, comprising:
(1) a central processing unit sequentially performing a series of operations in accordance with selectively accessed instructions; and
(2) memory means connected to said central processing unit, said memory providing storage for
   (a) a first subset of said instructions, said first subset of instructions being related to a first portion of the control system,
   (b) a second subset of said instructions, said second subset being related to a second portion of the control system, and
   (c) a stored set of information defining preselected operating routines and machine related data, each item of said set of information being subject to call by said first subset of instructions, said first subset of instructions being executable to produce commands controlling the operative results produced by execution of said second subset of instructions, and said commands being dependent on said machine related data and the operative results produced by execution of said routines.

19. A numerical control system of the type having a central processing unit for executing a set of stored instructions for controlling the operation of a machine tool in the performance of specified operations with respect to a workpiece, comprising:
(a) numerical control means for controlling plural axis motions of said machine tool, said numerical control means including a first set of instructions according to which the axis motives are controlled;
(b) machine control logic means for controlling the auxiliary functions of said machine tool, said machine control logic means including a second set of instructions according to which said auxiliary functions are controlled; and
(c) interface means for effecting coordinated operating between said numerical control means and said machine control logic means, said interface means comprising a series of functions, procedures and status flags, the procedures and functions of which are subject to calls by the machine control logic means for the production of commands to be issued thereby to the numerical control means, the numerical control means being responsive to said commands to generate said status flags depending on the commands and the machine tool operating conditions.

20. The system as defined by claim 19 wherein said series of functions, procedures and flags include:
(a) a plurality of customization routines which operate to establish predetermined modes or operating states in the numerical control means in response to said calls from the machine control logic means, provides specific input information from said machine control logic means in the numerical control means, command actions to be performed by the numerical control means in response to calls from the machine control logic means, and retrieve information from the numerical control means related to said modes, states and actions;
(b) a plurality of machine setup data routines which operate to request and receive machine setup data values stored in said numerical control means;
(c) a plurality of option validation routines which operate to permit the machine control logic means to query the numerical control means on the presense or absence of optional control features present in said numerical control means; and
(d) a plurality of Boolean flags generated in said numerical control means which are conveyed to the machine control logic means to indicate a status of various conditions and processes in the numerical control means.

21. A method for governing the operating of a computer controlled machine tool in the performance of specified operations with respect to a workpiece, comprising the steps of:
(a) executing a first set of stored instuctions governing a first control function of the machine tool;
(b) executing a second set of stored instructions governing a second control function of the machine tool; and
(c) executing a third set of stored instructions comprising a plurality of preselected operating routines on call from execution of the first set of instructions, to provide communications between said first and second sets of instructions, said first control function affecting said second control function under predetermined conditions resulting from said second control function and the execution of said operating routines.

22. The method of claim 21 wherein the second set of stored instructions is executed to control motion of the tool along mutually perpendicular axes and the first set of instructions is executed to control auxilliary functions associated with the tool.

23. the method of claim 22 further including the step of providing data indicative of the operative status of the tool motion control to determine control of the auxiliary functions.

* * * * *